US012021311B2

(12) United States Patent
Lee et al.

(10) Patent No.: US 12,021,311 B2
(45) Date of Patent: Jun. 25, 2024

(54) MISALIGNMENT COMPENSATION METHOD AND APPARATUS

(71) Applicant: SAMSUNG ELECTRONICS CO., LTD., Suwon-si (KR)

(72) Inventors: Hanyeop Lee, Suwon-si (KR); Seongmin Kang, Suwon-si (KR); Kyungchul Park, Suwon-si (KR); Jongin Lee, Suwon-si (KR); Jinchul Choi, Suwon-si (KR); Changho Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 21 days.

(21) Appl. No.: 17/861,265

(22) Filed: Jul. 11, 2022

(65) Prior Publication Data

US 2023/0006347 A1 Jan. 5, 2023

Related U.S. Application Data

(63) Continuation of application No. PCT/KR2022/008274, filed on Jun. 13, 2022.

(30) Foreign Application Priority Data

Jun. 30, 2021 (KR) ........................ 10-2021-0085673

(51) Int. Cl.
*H04B 17/00* (2015.01)
*H01Q 3/26* (2006.01)

(52) U.S. Cl.
CPC .................................. *H01Q 3/267* (2013.01)

(58) Field of Classification Search
CPC ...... H04B 7/0617; H04B 7/008; H04B 17/21; H04B 17/11; H04B 17/102; H04B 7/084;
(Continued)

(56) References Cited

U.S. PATENT DOCUMENTS 9,954,279 B1 * 4/2018 Pabst .................. H04B 17/102
10,425,910 B1 9/2019 Pajovic et al.
(Continued)

FOREIGN PATENT DOCUMENTS

JP 2014-187461 A 10/2014
KR 10-2014-0119195 A 10/2014
(Continued)

OTHER PUBLICATIONS

International Search Report dated Sep. 27, 2022 for PCT/KR2022/008274, citing the above reference(s). In conformance with MPEP 609—Concise explanation of the relevance includes issue date of foreign OA and references cited therein.

*Primary Examiner* — Khai Tran
(74) *Attorney, Agent, or Firm* — CANTOR COLBURN LLP

(57) ABSTRACT electronica communication device includes a first array antenna module including first antenna elements, a second array antenna module including second antenna elements and disposed adjacent to the first array antenna module, and a controller which detects misalignment between the first array antenna module and the second array antenna module based on communication between a first test group of the first antenna elements and a second test group of the second antenna elements.

20 Claims, 13 Drawing Sheets

(58) Field of Classification Search
CPC .... H04W 16/28; H04W 84/06; H04L 1/0091; H04L 43/16; H04L 1/20; H04L 1/24; G01S 2013/0254; G01S 3/023
USPC .......................................................... 375/224
See application file for complete search history.

(56) References Cited

U.S. PATENT DOCUMENTS

| | | | | |
|---|---|---|---|---|
| 10,833,750 | B2 | 11/2020 | Bhamidipati et al. | |
| 10,833,781 | B2 | 11/2020 | Garcia et al. | |
| 11,575,204 | B1 * | 2/2023 | Veysoglu | H01Q 3/34 |
| 2015/0325913 | A1 * | 11/2015 | Vagman | H01Q 3/34<br>342/368 |
| 2016/0173149 | A1 * | 6/2016 | Ling | H04B 1/40<br>375/346 |
| 2017/0201020 | A1 | 7/2017 | Chou et al. | |
| 2017/0229784 | A1 * | 8/2017 | Kitamura | H01Q 9/0414 |
| 2020/0091608 | A1 | 3/2020 | Alpman et al. | |
| 2020/0374015 | A1 | 11/2020 | Wang et al. | |
| 2021/0011121 | A1 | 1/2021 | Arbabian et al. | |
| 2021/0013602 | A1 | 1/2021 | Bates | |
| 2022/0123986 | A1 * | 4/2022 | Jiang | H04L 27/2613 |
| 2022/0286189 | A1 * | 9/2022 | Svendsen | H04B 7/086 |
| 2022/0416848 | A1 * | 12/2022 | Zhang | H04B 7/088 |
| 2023/0275347 | A1 * | 8/2023 | Lebron Garcia | H04B 17/11<br>343/702 |

FOREIGN PATENT DOCUMENTS

| | | | |
|---|---|---|---|
| KR | 10-1785980 | B1 | 10/2017 |
| KR | 10-2020-0080022 | A | 7/2020 |
| KR | 10-2021-0030626 | A | 3/2021 |

* cited by examiner

MISALIGNMENT COMPENSATION METHOD AND APPARATUS

CROSS-REFERENCE TO RELATED APPLICATIONS

This application is a PCT-Bypass of International Application No. PCT/KR2022/008274 designating the United States, filed on Jun. 13, 2022, which claims priority to Korean Patent Application No. 10-2021-0085673, filed on Jun. 30, 2021, at the Korean Intellectual Property Office, the content of which in its entirety is herein incorporated by reference.

BACKGROUND

1. Field

The following disclosure relates to a misalignment compensation method and an apparatus that performs the misalignment compensation method.

2. Description of Related Art

A wave in a millimeter band having a wavelength of several millimeters may be referred to as a millimeter wave or simply MMW, mmW, or mmWave. An array antenna may include a plurality of antenna elements in an array form. Such a array antenna may provide the virtual effect of a larger single antenna without actually being increased in size, and may be suitable for an attenuation characteristic of a high frequency band including a millimeter band. The array antenna may provide a high gain and a beam manipulation function and form a desired radiation pattern not achievable with a single antenna.

SUMMARY

When a plurality of array antenna modules is fixed to a circuit board, misalignment among the plurality of array antenna modules may occur.

According to various embodiments, a communication device includes a first array antenna module including first antenna elements, a second array antenna module including second antenna elements and disposed adjacent to the first array antenna module, and a controller which detects misalignment between the first array antenna module and the second array antenna module based on communication between a first test group of the first antenna elements and a second test group of the second antenna elements.

According to various embodiments, a misalignment compensation apparatus includes a processor, and a memory which stores instructions executable by the processor, where the processor, when the instructions are executed by the processor, detects misalignment between a first array antenna module and a second array antenna module of a communication device using a first test group of the first array antenna module and a second test group of the second array antenna module, and compensates for the misalignment between the first array antenna module and the second array antenna module using a first compensation group of a first array antenna module and a second compensation group of a second array antenna module.

According to various embodiments, a misalignment compensation method includes detecting misalignment between a first array antenna module and a second array antenna module of a communication device using a first test group of the first array antenna module and a second test group of the second array antenna module, where the first array antenna module and the second array antenna module are disposed adjacent to each other, and compensating for the misalignment between the first array antenna module and the second array antenna module using a first compensation group of a first array antenna module and a second compensation group of a second array antenna module.

According to various embodiments, misalignment among a plurality of array antenna modules may be effectively detected and compensated for.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
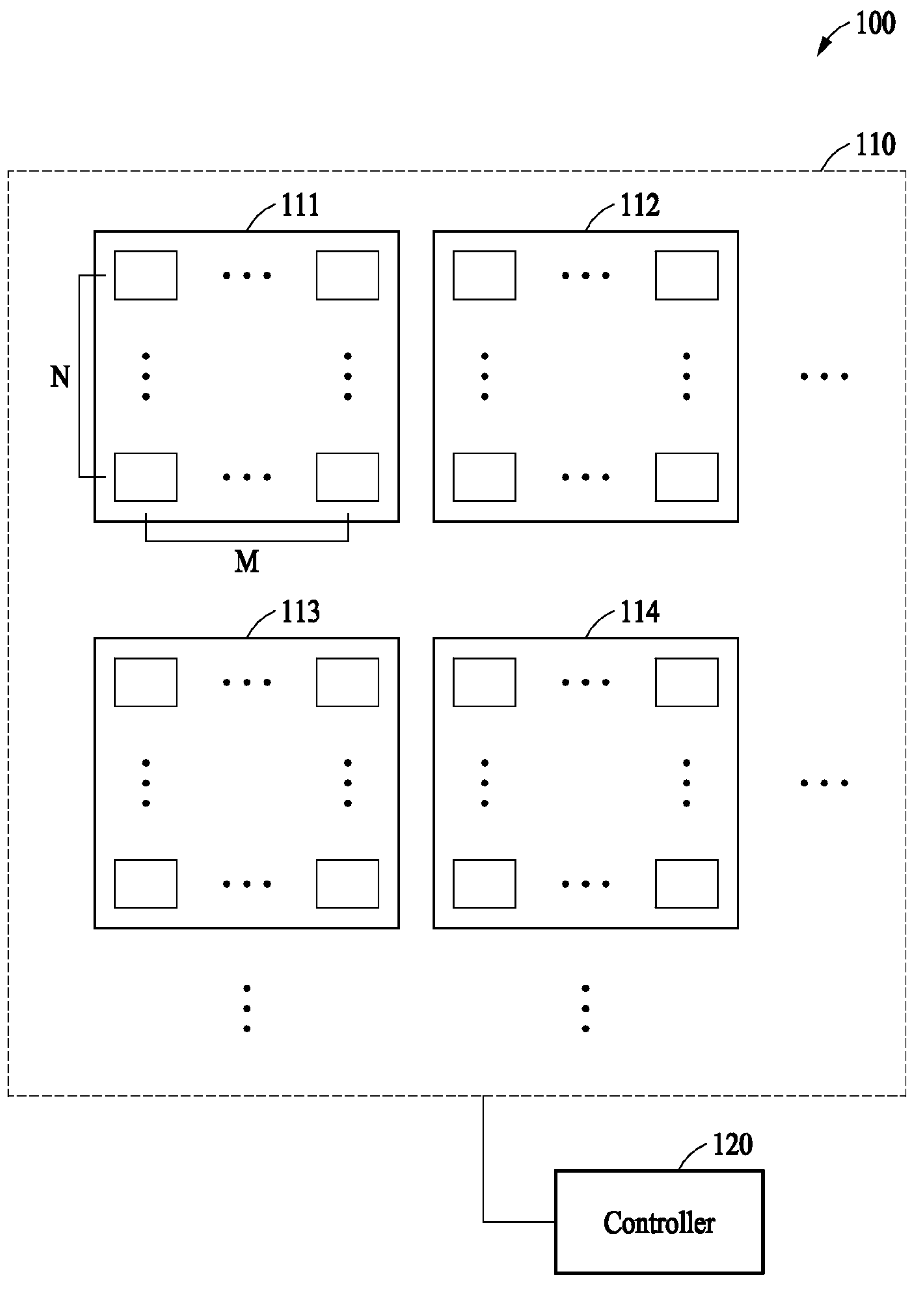
FIG. 1 illustrates a configuration of a communication device according to various embodiments.

Hereinafter, various embodiments will be described in detail with reference to the accompanying drawings. When describing the example embodiments with reference to the accompanying drawings, like reference numerals refer to like elements and any repeated description related thereto will be omitted.

FIG. 1 illustrates a configuration of a communication device according to various embodiments. Referring to FIG. 1, an embodiment of a communication device 100 may include an antenna circuit 110 and a controller 120. The antenna circuit 110 may include array antenna modules 111 to 114. The communication device 100 may operate based on a millimeter wave ("mmWave"). In an embodiment, for example, the array antenna modules 111 to 114 may be mmWave array antennas, and the communication device 100 may be network equipment (e.g., customer premises equipment ("CPE")) using a mmWave band.

The array antenna modules 111 to 114 may each include M×N antenna elements. M may represent a number of columns, and N may represent a number of rows. FIG. 1 shows an embodiment in which the antenna circuit 110 includes four array antenna modules 111 to 114, but not being limited thereto. Alternatively, the antenna circuit 110 may include two, three, five, or other number of array antenna modules. The array antenna modules 111 to 114 may be fixed to a circuit board. In an embodiment, for example, the array antenna modules 111 to 114 may be fixed to the circuit board in a form of a surface mount device ("SMD") or through a structure. In such an embodiment, misalignment may occur among the array antenna modules 111 to 114 on the circuit board.

The controller 120 may detect and compensate for misalignment among the array antenna modules 111 to 114. In an embodiment, for example, if a defect occurs in a first array antenna module 111, the controller 120 may detect and compensate for misalignment using a second array antenna module 112 and/or a third array antenna module 113 disposed adjacent to the first array antenna module 111. In such an embodiment, the controller 120 may obtain a test signal through communication between the first array antenna module 111 and the second array antenna module 112 and/or the third array antenna module 113 and detect and compensate for the misalignment based on a result of comparing the test signal and a normal signal. In an embodiment, the controller 120 may update a beambook of at least one selected from the array antenna modules 111 to 114 based on a compensation value.

Figure 2:
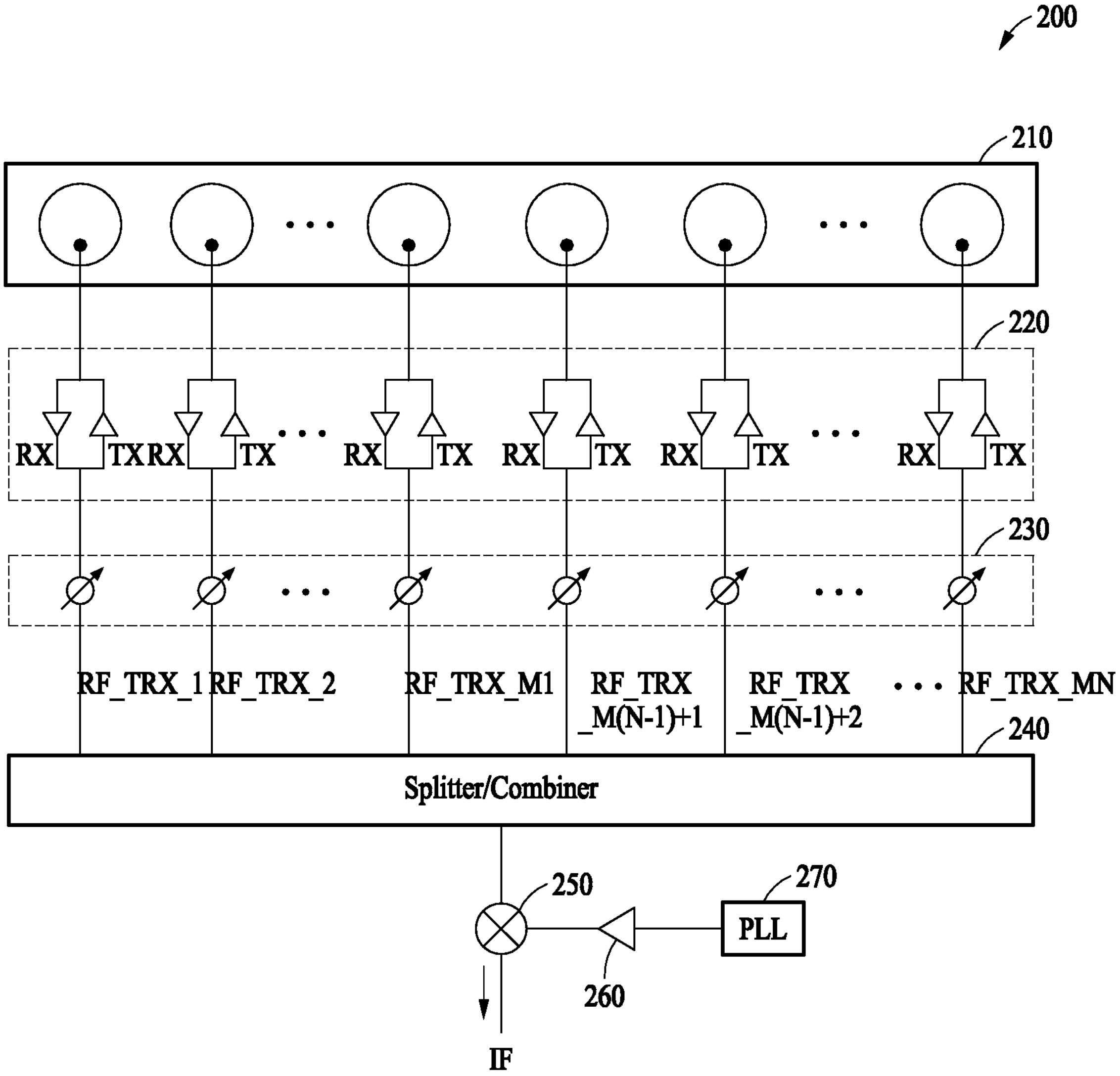
FIG. 2 illustrates an antenna circuit according to various embodiments.

FIG. 2 illustrates an antenna circuit according to various embodiments.

Referring to FIG. 2, an embodiment of an antenna circuit 200 may include an array antenna module 210, an amplifying circuit 220, a phase shifter 230, a splitter/combiner 240, a mixer 250, an amplifier 260, and a phase locked loop ("PLL") 270. At least a portion of the amplifying circuit 220, the phase shifter 230, the splitter/combiner 240, the mixer 250, the amplifier 260, and the PLL 270 may constitute a front end of a communication device, and the antenna circuit 200 may operate in an mmWave band.

The array antenna module 210 may include a plurality of antenna elements. In an embodiment where the antenna elements are in the form of an M×N array, a number of antenna elements may be M×N. Here, each of M and N is a natural number greater than 1. In such an embodiment, M×N antenna elements may transmit and receive signals of RF_TRX_H1 to RF_TRX_VMN. A signal in the mmWave band (e.g., a signal having a frequency of 20 gigahertz (GHz) or higher) may exhibit a higher attenuation characteristic (e.g., 20 decibels (dB) to 30 dB or higher) compared to a signal in an existing band (e.g., a signal having a frequency within the 6 GHz band). To overcome a coverage degradation issue thus arisen, a front end structure for simultaneously transmitting and receiving phase-aligned signals through a plurality of antenna elements disposed in an array form may be adopted.

The amplifying circuit 220 may be connected to each antenna element of the array antenna module 210. The amplifying circuit 220 may include a pair including a power amplifier ("PA") and a low noise amplifier ("LNA"). The phase shifter 230 may be connected to the amplifying circuit 220. The phase shifter 230 may correspond to a programmable phase shifter and adjust phases of signals applied to each antenna element to a desired level.

The splitter/combiner 240 may operate as a splitter during transmission and as a combiner during reception. The splitter/combiner 240 may branch transmitted and received signals at a ratio of 1:M×N and combine the transmitted and received signals at a ratio of M×N:1 to generate a sharp transmission/reception beam steered in a desired direction. The mixer 250, the amplifier 260, and the PLL 270 may perform a conversion operation between the transmitted and received signals and an intermediate frequency ("IF") signal of a motherboard. When an output power of one PA element is P, a theoretical equivalent isotropic radiated power ("EIRP") obtainable from a receiving end may be represented by Equation 1 below.

$$\text{EIRP}=P+20\log N+\text{ANT gain} \quad \text{[Equation 1]}$$

In Equation 1, ANT gain may correspond to a gain of each array antenna element. In a case where an array structure is not used, an output power used by one PA to obtain a same EIRP may be represented by P+20 log(N). If efficiency of a single PA is e, a power consumed in the array structure may be represented as N×P/e. In a case where the array structure is not used, power consumption may be N2×P/e, which may be N times more than a case where the array structure is used. The antenna circuit 200 may increase transmission efficiency in a dual polarized structure as shown in FIG. 3.

Figure 3:
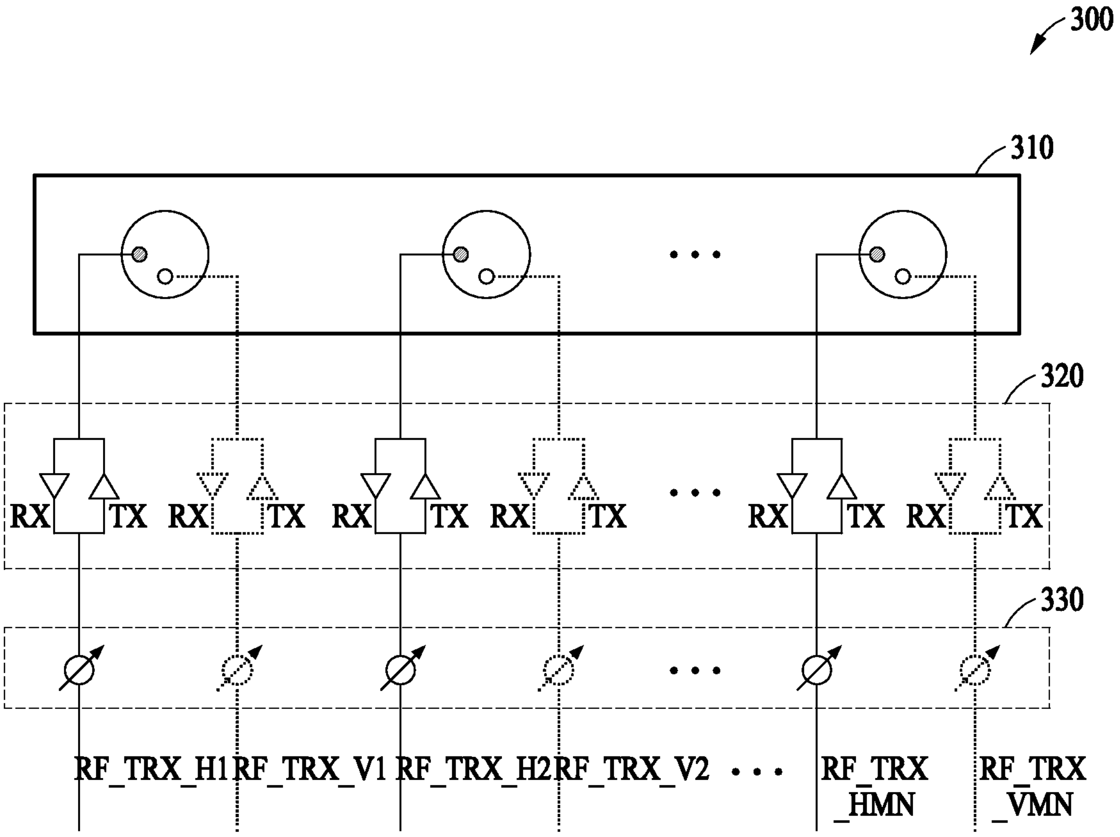
FIG. 3 illustrates a dual polarized structure of an antenna circuit according to various embodiments.

FIG. 3 illustrates a dual polarized structure of an antenna circuit according to various embodiments. Referring to FIG. 3, an embodiment of an antenna circuit 300 may include an array antenna module 310 having a dual polarized structure. Each antenna element of the array antenna module 310 may use transmitted and received signals having opposite polarities from each other. In an embodiment, for example, each antenna element may use a horizontal polarity signal RF_TRX_Hx and a vertical polarity signal RF_TRX_Vx. Here, x may be a value of 1 to MN. An amplifying circuit 320 may include a pair including a PA and an LNA, and a phase shifter 330 may adjust phases of signals applied to each antenna element to a desired level.

Figure 4:
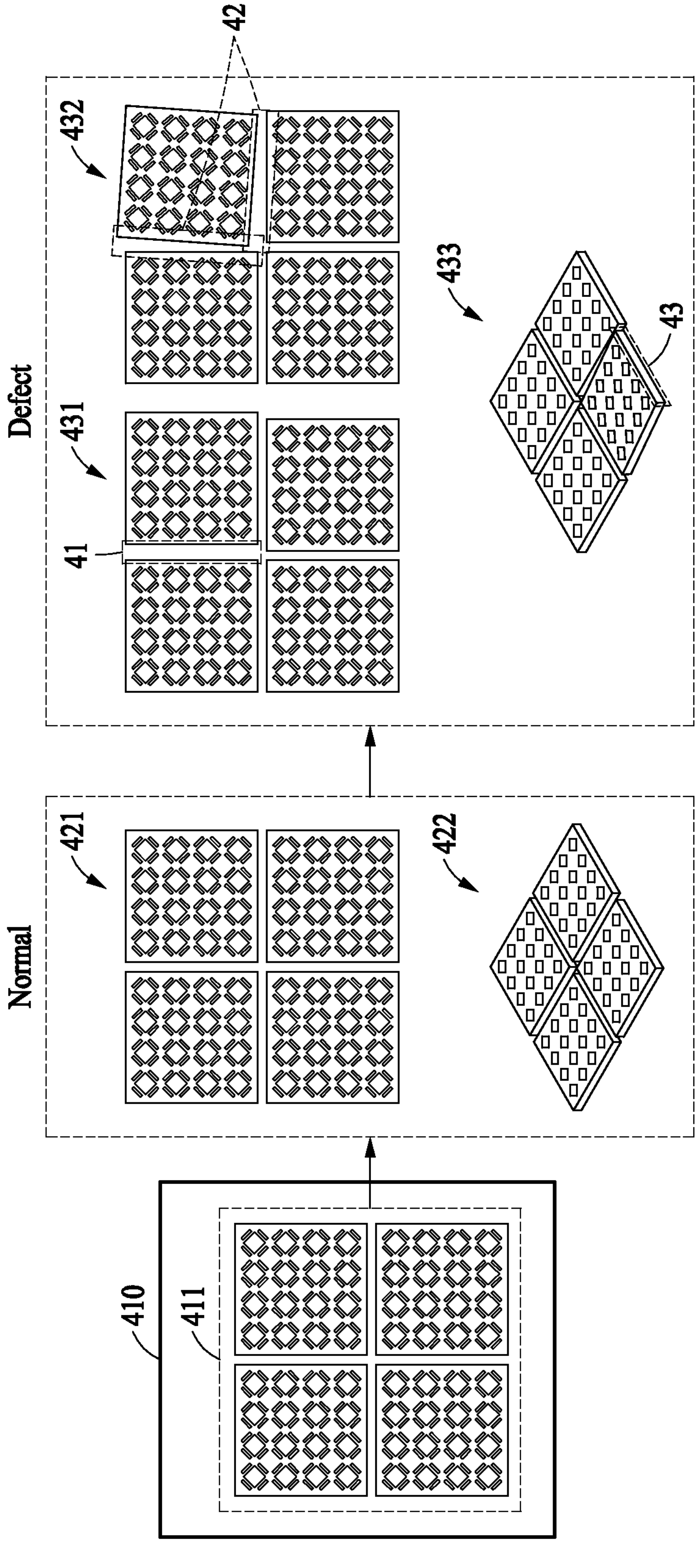
FIG. 4 illustrates misalignments of array antenna modules according to various embodiments.

FIG. 4 illustrates misalignments of array antenna modules according to various embodiments. Referring to FIG. 4, an embodiment of an antenna circuit 410 may include array antenna modules 411 disposed in a 2×2 array. Each of the array antenna modules 411 may include 4×4 antenna elements. Accordingly, the antenna circuit 410 may form an 8×8 array antenna. However, numerical values, such as 2×2, 4×4, and 8×8, are examples, and various other numerical values may be used.

According to various embodiments, the antenna circuit 410 may be used in a CPE communicating with a stationary base station. Installation conditions of the CPE supporting fifth generation ("5G") mmWave may include securing a line of sight ("LOS") between the base station and the CPE. In addition, a CPE model supporting Power Class 1 of 5G frequency range 2 ("FR2") mmWave may use peak EIRP performance of over 40 decibel-milliwatts (dBm), and the antenna circuit 410 may realize peak performance where the array antenna modules 411 with elements formed in a 4×4 array are disposed in a 2×2 array.

The array antenna modules 411 may be fixed to a circuit board. In an embodiment, for example, the array antenna modules 411 may be fixed to the circuit board in a form of a SMD or through a structure. The array antenna modules 411 may be disposed at regular intervals to maintain constancy of an array antenna factor. If misalignment occurs among the array antenna modules 411, the array antenna factor may decrease. A radiation pattern of an array structure antenna may be represented as multiplication of a pattern of a single antenna and an array antenna factor according to an antenna theory. In an embodiment, a decrease in the array antenna factor due to a misalignment defect may be prevented by compensating for an effect of a misalignment defect.

In FIG. 4, array antenna modules 421 and 422 may correspond to a normal state, and array antenna modules 431 to 433 may correspond to a defective state. In a normal state, modules of the array antenna modules 421 and 422 may be disposed at regular intervals, and in a defective state, at least some modules of the array antenna modules 431 to 433 may be misaligned. In FIG. 4, boxes 41, 42, and 43 may indicate the defective state. In an embodiment, for example, array antenna modules 431 may indicate a defect (or in a detective state) in a case where modules are disposed at wide intervals, array antenna modules 432 may indicate a defect in a case where a module is rotated and disposed, or array antenna modules 433 may indicate a defect in a case where a surface of a module that contacts a circuit board is unevenly tilted.

Figure 5:
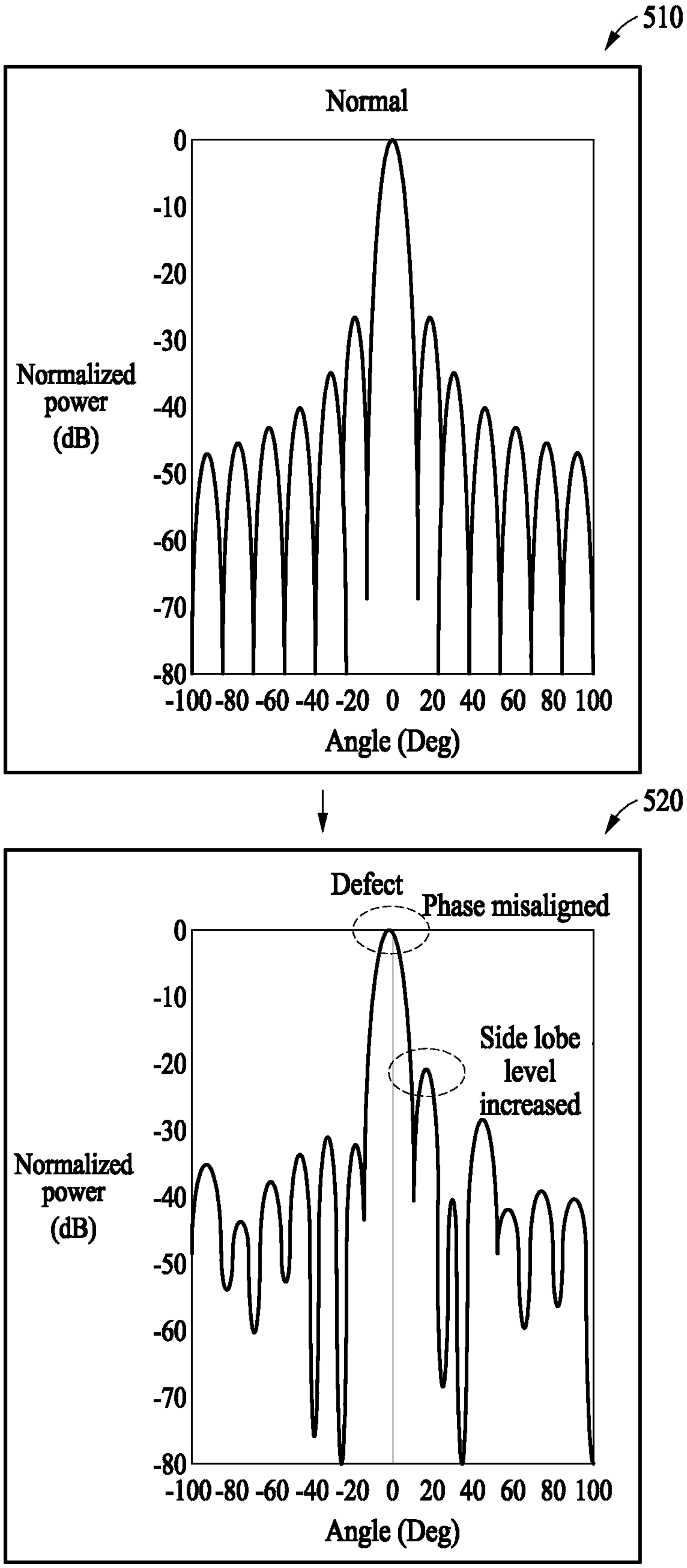
FIG. 5 illustrates an array antenna factor corresponding to a normal state and a misaligned state according to various embodiments.

FIG. 5 illustrates an antenna array factor in a normal state and a misaligned state according to various embodiments. In FIG. 5, an antenna array factor 510 may correspond to a normal state, and an antenna array factor 520 may correspond to a defective state. In an embodiment, for example, the antenna array factor 520 may indicate a defective state in which an upper right module of modules in a 2×2 array is tilted by about 15 degrees more than in a normal state and a gain thus obtained is degraded by about 2 dB. The antenna array factor 520 may have a misaligned phase and an increased side lobe level compared to the antenna array factor 510. In an embodiment, for example, the antenna array factor 520 may indicate a state in which a beam of a main lobe is tilted left by about 5 degrees and a level of a side lobe on a right side of the main lobe is rapidly increased. This sudden increase in the side lobe level may cause a sudden communication failure. When an influence due to a misalignment defect is compensated for, array antenna modules in a defective state as indicated by the antenna array factor 520 may appear to be in a normal state as indicated by the antenna array factor 510.

Figure 6A:
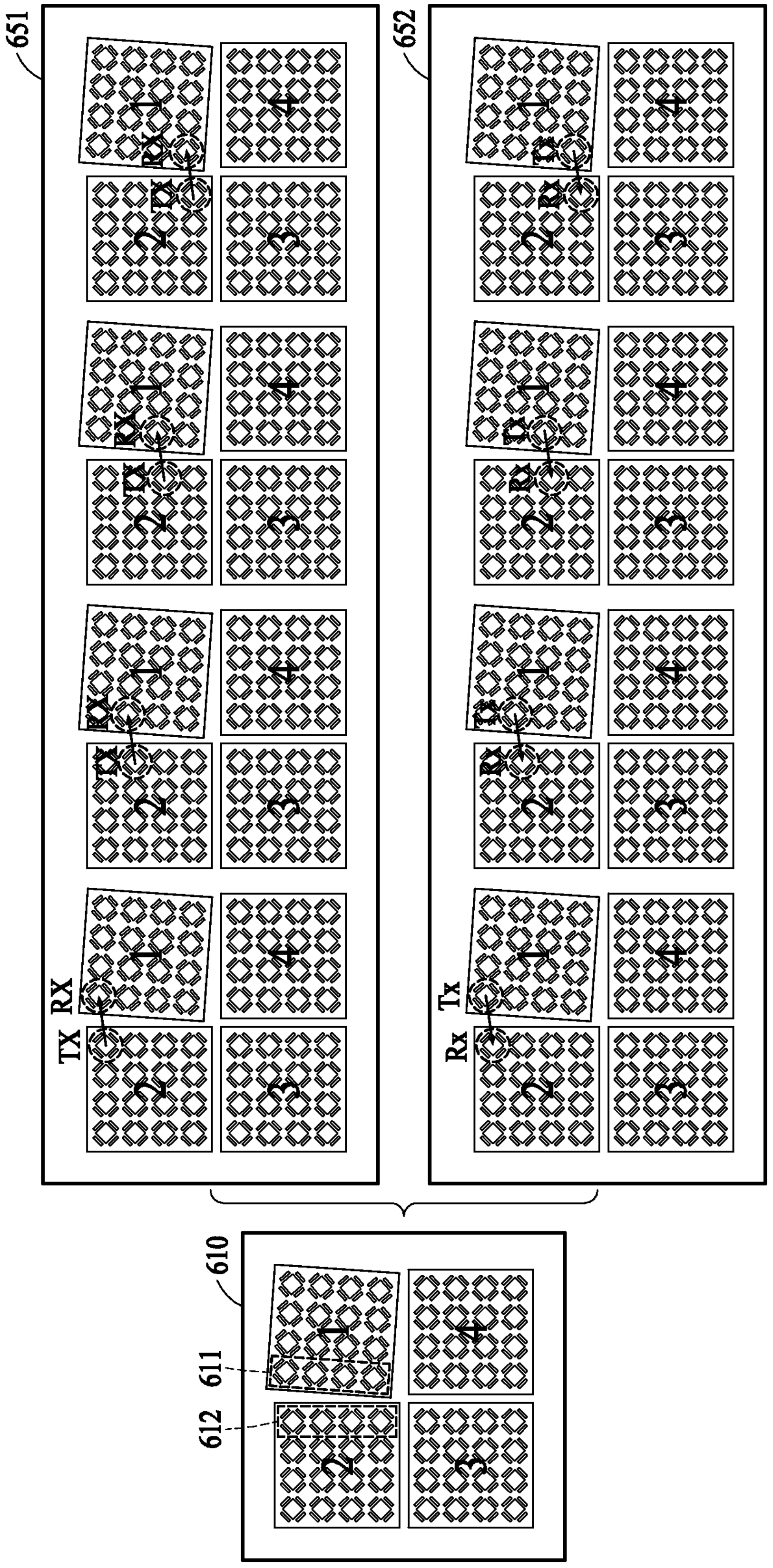
FIGS. 6A to 6C illustrate communication operations of test groups and compensation groups according to various embodiments.
Figure 6B:
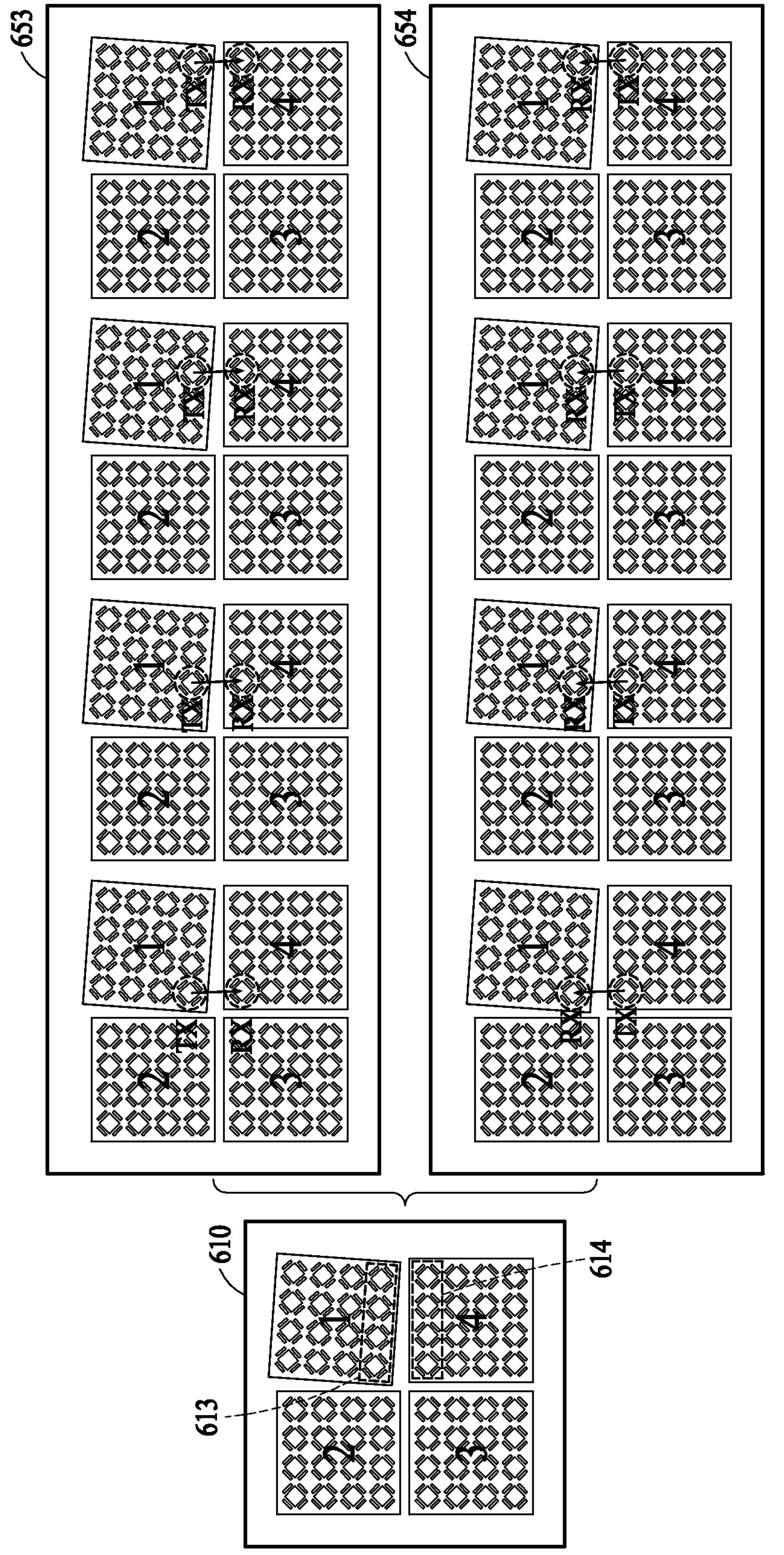
Figure 6C:
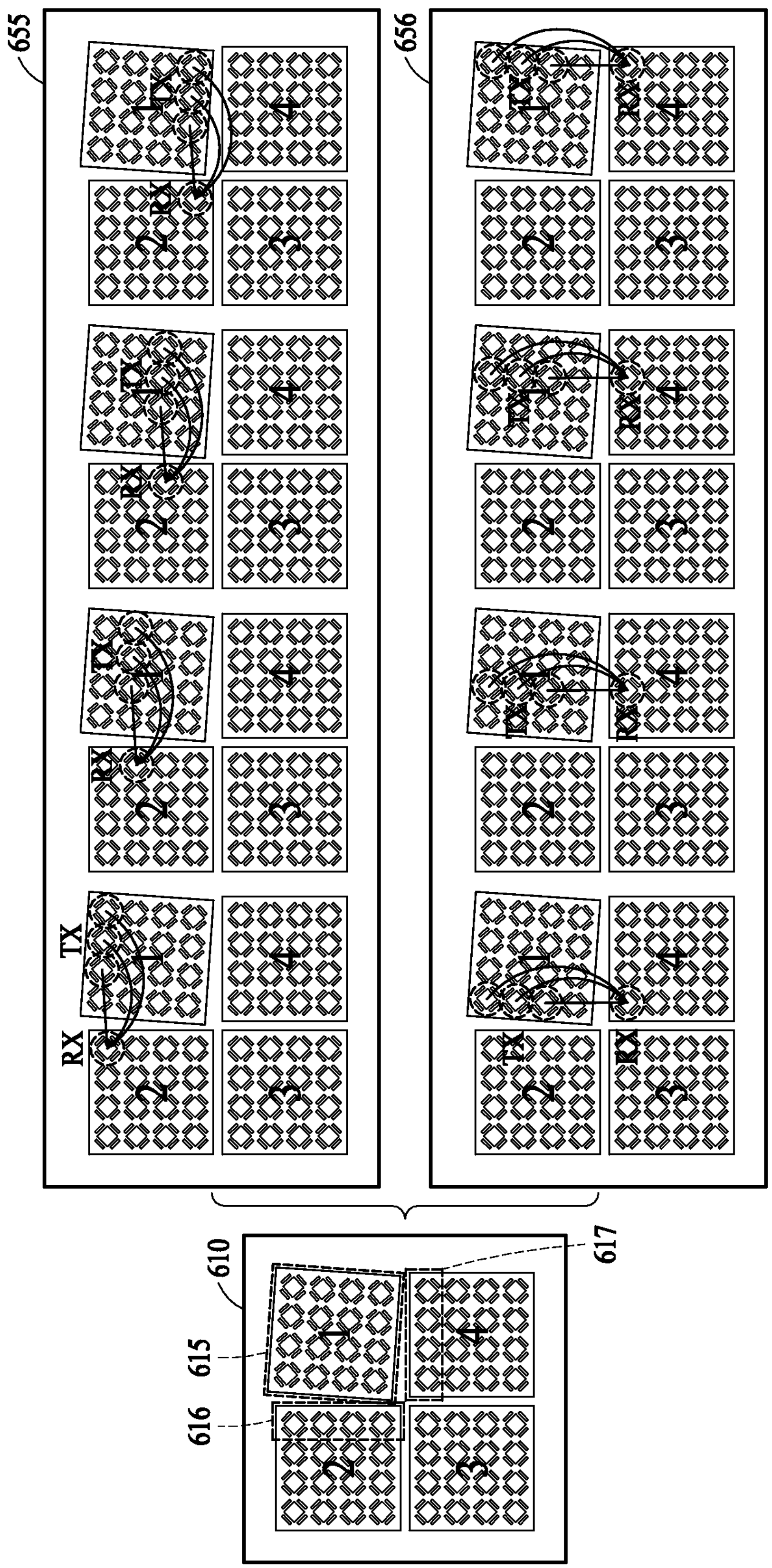

FIGS. 6A to 6C illustrate communication operations of test groups and compensation groups according to various embodiments. Referring to FIGS. 6A to 6C, in an embodiment, array antenna modules 610 may include a first array antenna module to a fourth array antenna module. In an embodiment, in a case where the first array antenna module has a defect due to misalignment, an operation of detecting a defect of the first array antenna module using a test group including antenna elements 611 to 614 may be performed as shown in FIGS. 6A and 6B, and an operation of compensating for a defect using a compensation group including antenna elements 615 to 617 may be performed as shown in FIG. 6C. An antenna element for each of the array antenna modules 610 may be referred to as a test antenna element when used in a test operation and as a compensation antenna element when used in a compensation operation.

Referring to FIG. 6A, first test antenna elements 611 of a first test group may belong to the first array antenna module, and second test antenna elements 612 of a second test group may belong to a second array antenna module disposed adjacent to the first array antenna module. Neighboring antenna elements in neighboring modules may be adopted as a test group. In an embodiment, the first test group may be positioned in an outer region of the first array antenna module facing the second array antenna module, and the second test group may be positioned in an outer region of the second array antenna module facing the first array antenna module. Alternatively, a test group may be defined with antenna elements in another region.

A test signal may be obtained through communication between the first test antenna elements 611 and the second test antenna elements 612. Referring to FIG. 6A, when a test signal is transmitted through the second test antenna elements 612 as shown in box 651, the test signal may be obtained by the first test antenna elements 611, and when the test signal is transmitted through the first test antenna elements 611, the test signal may be obtained by the second test antenna elements 612 as shown in box 652.

In an embodiment, a dual polarized structure is used, such that opposite polarities may be applied to the first test antenna elements 611 and the second antenna elements 612. Accordingly, a test may be performed in a high isolation state. In an embodiment, for example, a first polarity may be applied to the first test antenna elements 611 and a second polarity may be applied to the second test antenna elements 612. In such an embodiment, the first polarity may be applied during transmission and the second polarity may be applied during reception. In an embodiment, for example, the first polarity is a horizontal polarity, and the second polarity may be a vertical polarity. Alternatively, the first polarity is a vertical polarity, and the second polarity may be a horizontal polarity.

The test signal may be compared with a normal signal. The normal signal may be measured in advance using an array antenna module in a normal state. In an embodiment, for example, a gain value and a phase value of the test signal may be compared with a gain value and a phase value of the normal signal. A gain value may be an automatic gain control ("AGC") value. A difference (e.g., a gain difference and/or a phase difference) between the test signal and the normal signal may be compared with a threshold, and misalignment may be detected or determined based on a result of comparing. When the difference is greater than the threshold, misalignment may be detected or it is determined that misalignment occurs. In such an embodiment, a transmission/reception gain and phase of each of the array antenna modules 610 may be calibrated in advance.

Referring to FIG. 6A, when misalignment is detected, operations of the boxes 651 and 652 may be sequentially performed. Firstly, as shown in the box 651, the first array antenna module may operate as a reception antenna and the second array antenna module may operate as a transmission antenna to obtain a test signal, and when a difference between the test signal and a normal signal is greater than a threshold, secondly, operations of the box 652 may be performed. As shown in the box 652, the first array antenna module may operate as a transmission antenna and the second array antenna module may operate as a reception antenna to obtain a test signal, and when a difference between the test signal and a normal signal is greater than the threshold, it may be determined that there is misalignment.

By operations shown in FIG. 6A, it may be determined that there is misalignment between the first array antenna module and the second array antenna module, but it may not be possible to determine which module is misaligned. In this case, as shown in FIG. 6B, it is possible to detect which module of the first array antenna module and the second array antenna module is defective using another neighboring module (e.g., a fourth array antenna module).

Referring to FIG. 6B, third test antenna elements 613 of a third test group may belong to the first array antenna module, and fourth test antenna elements 614 of a fourth test group may belong to the fourth array antenna module disposed adjacent to the first array antenna module. A test signal may be obtained through communication between the third test antenna elements 613 and the fourth test antenna elements 614. Referring to FIG. 6B, when a test signal is transmitted through the third test antenna elements 613 as shown in box 653, the test signal may be obtained by the fourth test antenna elements 614, and when the test signal is transmitted through the fourth test antenna elements 614, the test signal may be obtained by the third test antenna elements 613 as shown in box 654. The specific test operation of FIG. 6A described above may be also applied a specific test operation of FIG. 6B. When misalignment is detected between the first array antenna module and the fourth array antenna module based on the test signal, a defect of the first array antenna module may be detected.

When the defect of the first array antenna module is detected, a compensation value may be derived through operations of FIG. 6C to compensate for the defect of the first array antenna module. Referring to FIG. 6C, first compensation antenna elements 615 of a first compensation group may belong to the first array antenna module, second compensation antenna elements 616 of a second compensation group may belong to the second array antenna module disposed adjacent to the first array antenna module, and fourth compensation antenna elements 617 of a fourth compensation group may belong to the fourth array antenna module disposed adjacent to the first array antenna module. The first compensation group may include an antenna element having a wider region than the first test group, and the second compensation group and a third compensation group may include a same antenna element as the second test group and the fourth test group. Alternatively, a compensation group may be defined with antenna elements in another region.

A test signal may be obtained through communication between the first compensation antenna elements 615 and the second compensation antenna elements 616 and between the first compensation antenna elements 615 and the fourth compensation antenna elements 617. When the test signal is transmitted through the first compensation antenna elements 615, the test signal may be obtained by the second compensation antenna elements 616 and the fourth compensation antenna elements 617. Referring to FIG. 6C, the test signal may be obtained by the first compensation antenna elements 615 and the second compensation antenna elements 616 positioned in a same row as shown in box 655, and the test signal may be obtained by the first compensation antenna elements 615 and the fourth compensation antenna elements 617 positioned in a same column as shown in box 656. For some antenna elements corresponding to the first test group among the first compensation antenna elements 615, since the test signal obtained through a misalignment detection operation exists, a test signal may be obtained by remaining antenna elements as shown in the boxes 655 and 656. An additional test signal may be obtained by changing transmission and reception functions of compensation antenna elements and/or changing polarized combinations.

The test signal may be compared with a normal signal. The normal signal may be measured in advance using an array antenna module in a normal state. In an embodiment, for example, a gain value and a phase value of the test signal may be compared with a gain value and a phase value of the normal signal. A gain value may be an AGC value. A compensation value may be determined based on a difference (e.g., a gain difference and/or a phase difference) between the test signal and the normal signal, and misalignment may be compensated for based on the compensation value. The compensation value to be determined may be a value that may compensate for a difference in a gain value and a phase value of the first array antenna module, such that the values may appear to be the normal values of a normal signal.

A compensation value determined based on a test signal of the second compensation antenna elements 616 may be referred to as a first compensation value, and a compensation value determined based on a test signal of the fourth compensation antenna elements 617 may be referred to as a second compensation value. Since the first compensation value may reflect misalignment between the first array antenna module and the second array antenna module, and the second compensation value may reflect misalignment between the first array antenna module and the fourth array antenna module, the first compensation value and the second compensation value may be combined. In an embodiment, for example, a combined compensation value may be derived through interpolation based on the first compensation value and the second compensation value. In an embodiment, a transmission/reception gain and phase of each of the array antenna modules 610 may be calibrated in advance.

Figure 7:
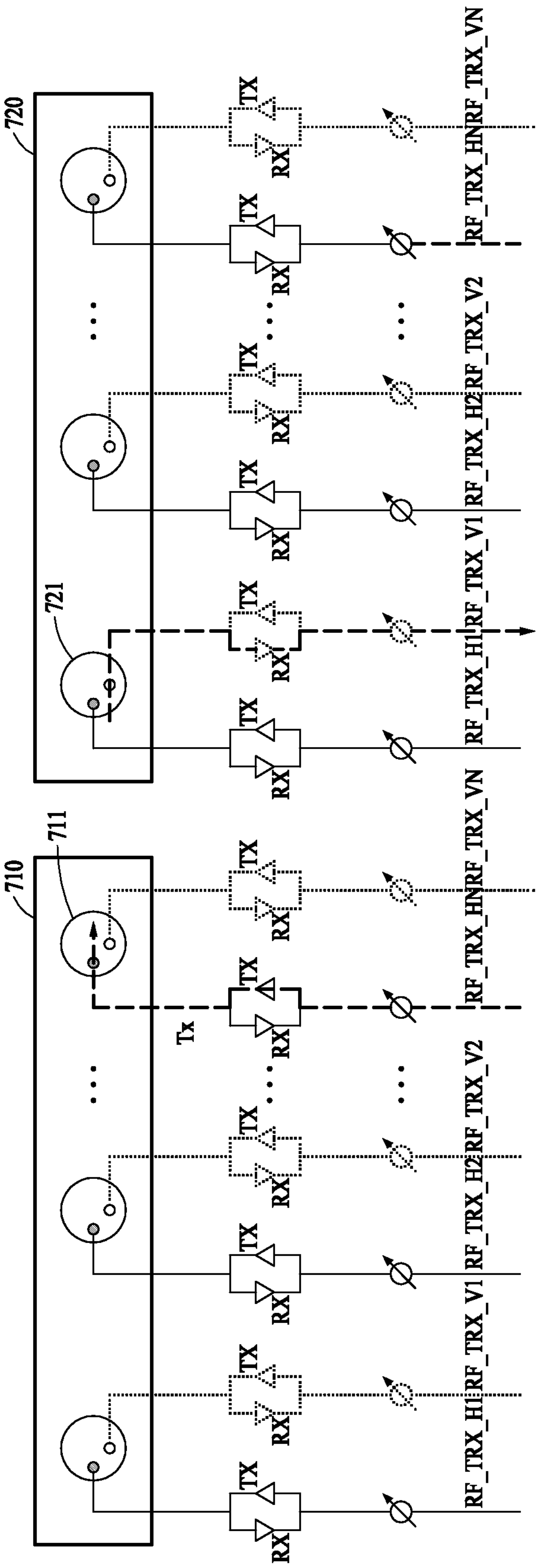
FIG. 7 illustrates a communication operation using a dual polarized structure according to various example embodiments.

FIG. 7 illustrates a communication operation using a dual polarized structure according to various embodiments. Referring to FIG. 7, a first array antenna module 710 and a second array antenna module 720 may have a dual polarized structure, and a first array antenna element 711 and a second array antenna element 721 with opposite polarities may communicate with each other. When the first array antenna element 711 with a first polarity (e.g., a horizontal polarity) transmits a signal, the second array antenna element 721 with a second polarity (e.g., a vertical polarity) may receive the signal. Accordingly, high isolation may be achieved. A signal transmitted by the first array antenna element 711 with the second polarity (e.g., the vertical polarity) is received by the first array antenna element 711 with the first polarity (e.g., the horizontal polarity) to obtain an additional test signal.

In an embodiment, it is possible to repeat communication by changing a polarized combination of the first array antenna element 711 and the second array antenna element 712. If there is a polarized combination in which the first polarity is applied to the first array antenna element 711 and the second polarity is applied to the second array antenna element 712, there may be a polarized combination in which the second polarity is applied to the first array antenna element 711 and the first polarity is applied to the second array antenna element 712. By changing a polarized combination in this way, more test samples may be obtained, which may lead to more sophisticated compensation.

Figure 8:
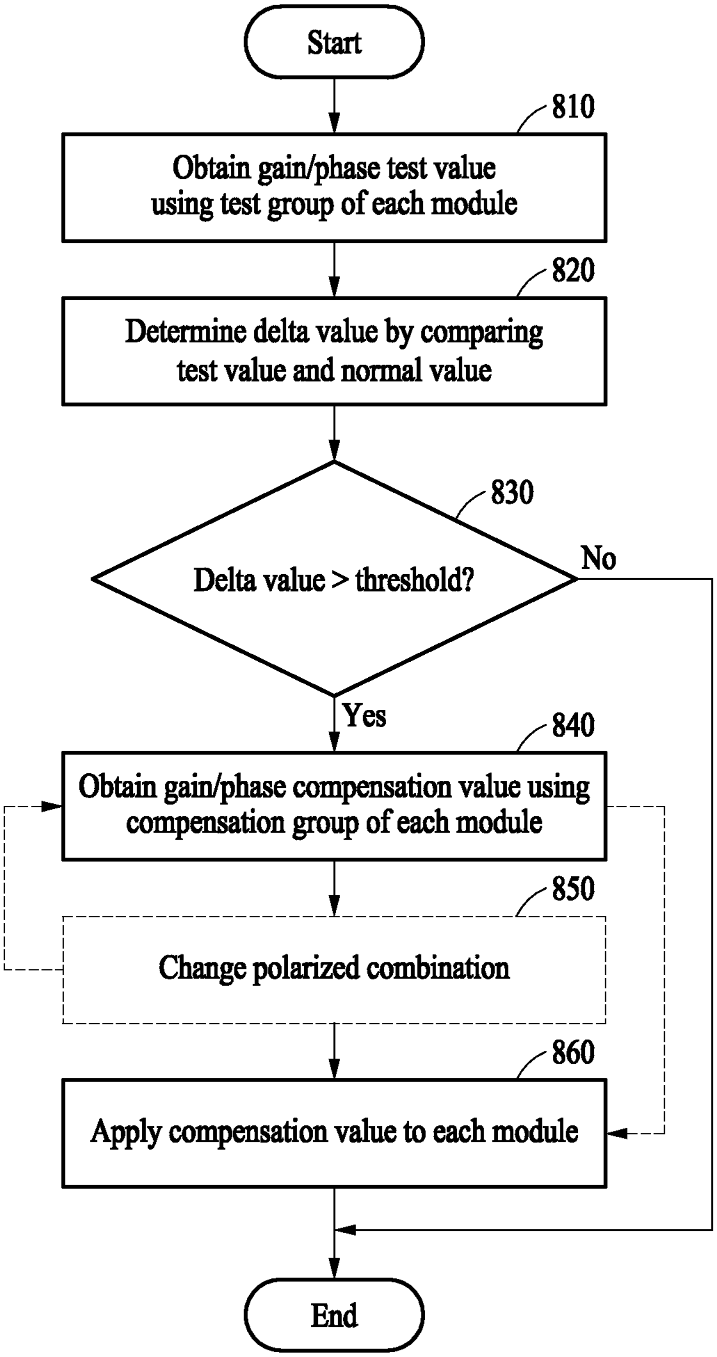
FIG. 8 is a flowchart illustrating a test operation and a compensation operation according to various embodiments.

FIG. 8 is a flowchart illustrating a test operation and a compensation operation according to various embodiments. Operations 810 to 860 to be described hereinafter with reference to FIG. 8 may be performed sequentially or non-sequentially. In an embodiment, for example, the order of operations 810 to 860 may be changed, and/or at least two of operations 810 to 860 may be performed in parallel. Operations 810 to 860 may be performed by at least one component (e.g., the controller 120 of FIG. 1, a controller 1012 of FIG. 10, and a processor 1021 of FIG. 10) of a communication device (e.g., the communication device 100 of FIG. 1 and a communication device 1010 of FIG. 10) and/or a misalignment compensation apparatus 1020 of FIG. 10.

Referring to FIG. 8, a gain and phase test value may be obtained using a test group of each module in operation 810. When a target module is determined among array antenna modules, a test signal may be obtained using a test group of the target module and at least one neighboring module adjacent to the target module. In an embodiment, for example, antenna elements in an outer region of the target module facing the neighboring module and antenna elements in an outer region of the neighboring module facing the target module may belong to the test group. A gain value and a phase value of the test signal may correspond to the test value.

In operation 820, a delta value is determined by comparing the test value with a normal value. The normal value may be a gain value and a phase value of a normal signal obtained in advance using an array antenna module in a normal state, and the delta value may correspond to a difference between the gain value and the phase value of the test signal and the gain value and the phase value of the normal signal.

In operation 830, the delta value and a threshold are compared. The threshold may be set in advance for the gain value and/or the phase value of the delta value. If the delta value is greater than the threshold, it may be determined that a misalignment state is detected, and thus, the misalignment state may be compensated for through operation 840, and if the delta value is smaller than the threshold, it may be determined that a normal state is detected, and thus, a test and a compensation operation may be terminated. Operations 810 to 830 may be repeatedly performed in a setting in which a neighboring module receives the test signal transmitted by the target module and a setting in which the target module receives the test signal transmitted by the neighboring module, and in both settings, if the delta value is greater than the threshold, a misalignment state may be detected.

In operation 840, a gain/phase compensation value may be obtained using a compensation group of each module. The test signal may be obtained using a compensation group of the target module and at least one neighboring module adjacent to the target module. In an embodiment, for example, all antenna elements of the target module and antenna elements of a test group of a neighboring module may belong to a compensation group. A gain value and a phase value of the test signal may correspond to the compensation value. When there is a test value for a compensation group previously obtained through operations 810 and 820, a compensation value may be obtained using the corresponding test value. When there is a plurality of neighboring modules, compensation values obtained through the plurality of neighboring modules may be combined and used.

In an embodiment where a dual polarized structure is used, a polarized combination may be changed through operation 850. In an embodiment, for example, when operation 840 is performed through a polarized combination in which the first polarity is applied to a target module and the second polarity is applied to a neighboring module, the second polarity may be applied to the target module and the first polarity may be applied to the neighboring module by changing a polarized combination of operation 850, and then operation 840 may be performed again through the corresponding polarized combination. In such an embodiment where a plurality of compensation values is obtained through different polarized combinations, a final compensation value may be derived through combination of the compensation values.

Once a compensation value is determined, the compensation value may be applied to each module in operation 860. In an embodiment, for example, a beambook that stores parameters related to various beam patterns may be provided, and a beambook parameter of the target module may be updated based on a compensation value related to the target module. In such an embodiment, the test and the compensation operation described above with reference to FIGS. 1 to 7 and 9 to 11 may be applied to a test and a compensation operation thereof.

Figure 9:
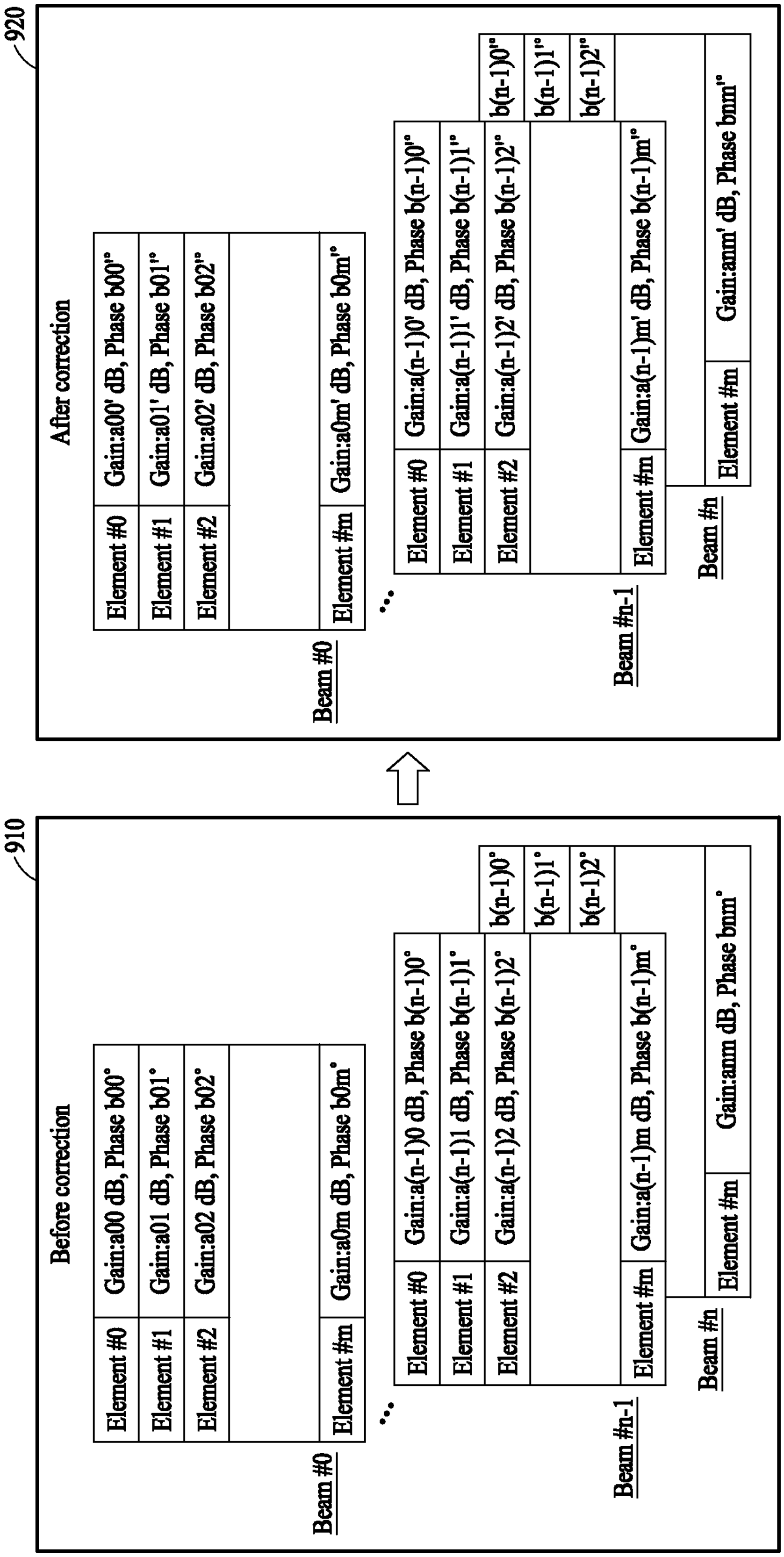
FIG. 9 illustrates a process of updating a beambook according to various embodiments.

FIG. 9 illustrates a process of updating a beambook according to various embodiments. A beambook is a list of beam combinations operated by a terminal and may define a parameter value (e.g., an amplitude, a phase, etc.) of each antenna element for forming each beam. Referring to FIG. 9, parameters of a beambook 910 may be corrected to be as those of a beambook 920 based on a compensation value. The beambook 910 and the beambook 920 may store a combination of parameters for generating various beam patterns Beam #0 to Beam #n. The parameters may include gain values and phase values. In an embodiment, for example, a beam pattern Beam #0 may be formed through gain values a00 to a0m and phase values b00 to b0m of array antenna elements Element #0 to Element #m. In a case where an array antenna module has a defect, the beam pattern Beam #0 before correction may have an abnormal shape. The gain values a00 to a0m and the phase values b00 to b0m may be corrected to be gain values a00' to a0m' and phase values b00' to b0m' according to a compensation value, and the beam pattern Beam #0 may be formed in a normal shape through the gain values a00 to a0m and the phase values b00 to b0m.

Figure 10:
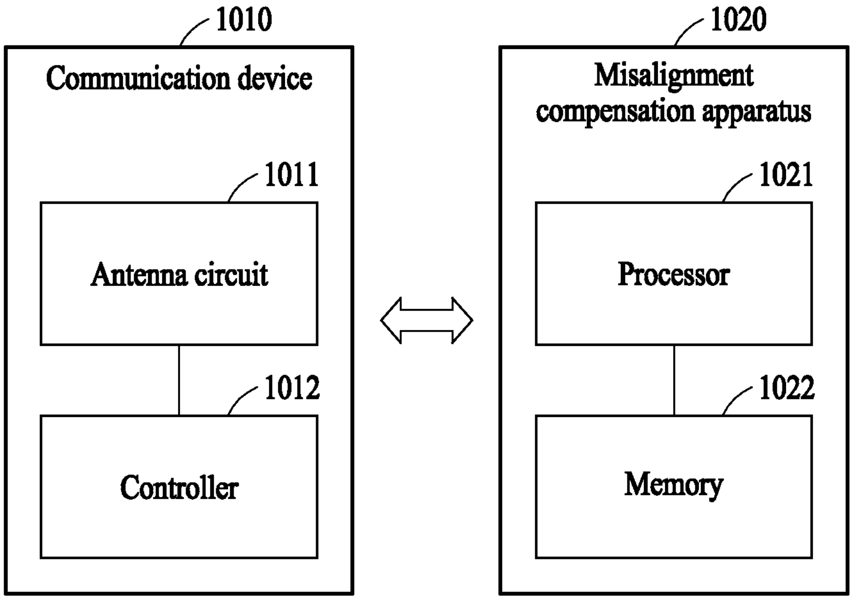
FIG. 10 is a block diagram illustrating a configuration of a communication device and a misalignment compensation apparatus according to various embodiments.

FIG. 10 is a block diagram illustrating a configuration of a communication device and a misalignment compensation apparatus according to various embodiments. Referring to FIG. 10, a communication device 1010 may include an antenna circuit 1011 and a controller 1012. The controller 1012 may include at least one processor (not shown) and at least one memory (not shown) for controlling the antenna circuit 1011.

The antenna circuit 1011 may include a first array antenna module including first antenna elements and a second array antenna module including second antenna elements and disposed adjacent to the first array antenna module. The controller 1012 may detect misalignment between the first array antenna module and the second array antenna module based on communication between a first test group of the first antenna elements and a second test group of the second antenna elements.

The controller 1012 may obtain a test signal through communication between antenna elements of the first test group and antenna elements of the second test group and detect misalignment between the first array antenna module and the second array antenna module based on a difference between the test signal and a normal signal. The controller 1012 may compare a gain and a phase of the test signal with a gain and a phase of the normal signal.

The antenna circuit 1011 may further include a third array antenna module including third antenna elements and disposed adjacent to the first array antenna module. The controller 1012 may detect misalignment between the first array antenna module and the third array antenna module based on communication between the first test group of the first antenna elements and a third test group of third antenna elements and detect a defective module from among the first array antenna module, the second array antenna module, and the third array antenna module.

The first test group may be positioned in an outer region of the first array antenna module facing the second array antenna module, and the second test group may be positioned in an outer region of the second array antenna module facing the first array antenna module. The first antenna elements and the second antenna elements have a dual polarized structure with opposite polarities and communicate with each other.

The controller 1012 may perform a first test by applying a first polarity to the first antenna elements and applying a second polarity to the second antenna elements, perform a second test by applying the second polarity to the first antenna elements and applying the first polarity to the second antenna elements, and detect misalignment between the first array antenna module and the second array antenna module based on the first test and the second test.

The controller 1012 may obtain a first test signal through communication between a first compensation group of the first antenna elements and a second compensation group of the second antenna elements, determine a first compensation value based on a difference between the first test signal and a first normal signal, and correct a beam setting of one of the first array antenna module and the second array antenna module based on the first compensation value. The controller 1012 may combine the first compensation value and a second compensation value by performing interpolation based on the first compensation value and the second compensation value. The controller 1012 may apply the correcting of the beam setting (or the corrected beam setting) to a beambook parameter.

A misalignment compensation apparatus 1020 may include a processor 1021 and a memory 1022. The misalignment compensation apparatus 1020 may directly control the antenna circuit 1011 or control the antenna circuit 1011 through the controller 1012. The memory 1022 may be connected to the processor 1021 and store instructions executable by the processor 1021, data to be computed by the processor 1021, or data processed by the processor 1021. The memory 1022 may include a non-transitory computer-readable medium (e.g., a high-speed random access memory) and/or a non-volatile computer-readable medium (e.g., at least one disk storage device, flash memory device, or another non-volatile solid-state memory device).

The processor 1021 may execute the instructions to perform the operations of FIGS. 1 to 9 and 11. The processor 1021 may detect the misalignment between the first array antenna module and the second array antenna module using a test group of the first array antenna module of the communication device 1010 and a test group of the second array antenna module of the communication device 1010 and compensate for the misalignment between the first array antenna module and the second array antenna module using a compensation group of the first array antenna module and a compensation group of the second array antenna module.

The antenna circuit 1011 may further include the third array antenna module including the third antenna elements and disposed adjacent to the first array antenna module, and the processor 1021 may detect the misalignment between the first array antenna module and the third array antenna module based on the communication between the first test group of the first antenna elements and the third test group of the third antenna elements and detect the defective module from among the first array antenna module, the second array antenna module, and the third array antenna module.

The processor 1021 may obtain the first test signal through the communication between the first compensation group of the first antenna elements and the second compensation group of the second antenna elements, determine the first compensation value based on the difference between the first test signal and the first normal signal, and correct the beam setting of at least one of the first array antenna module and the second array antenna module based on the first compensation value.

The antenna circuit 1011 may further include the third array antenna module including the third antenna elements and disposed adjacent to the first array antenna module, and the processor 1021 may obtain a second test signal through communication between the first compensation group of the first antenna elements and a third compensation group of the third antenna elements, determine a second compensation value based on a difference between a second test signal and a second normal signal, and correct the beam setting of at least one of the first array antenna module, the second array antenna module, and the third array antenna module by combining the first compensation value and the second compensation value. The descriptions of FIGS. 1 to 9 and 11 may also apply to the communication device 1010 and the misalignment compensation apparatus 1020.

Figure 11:
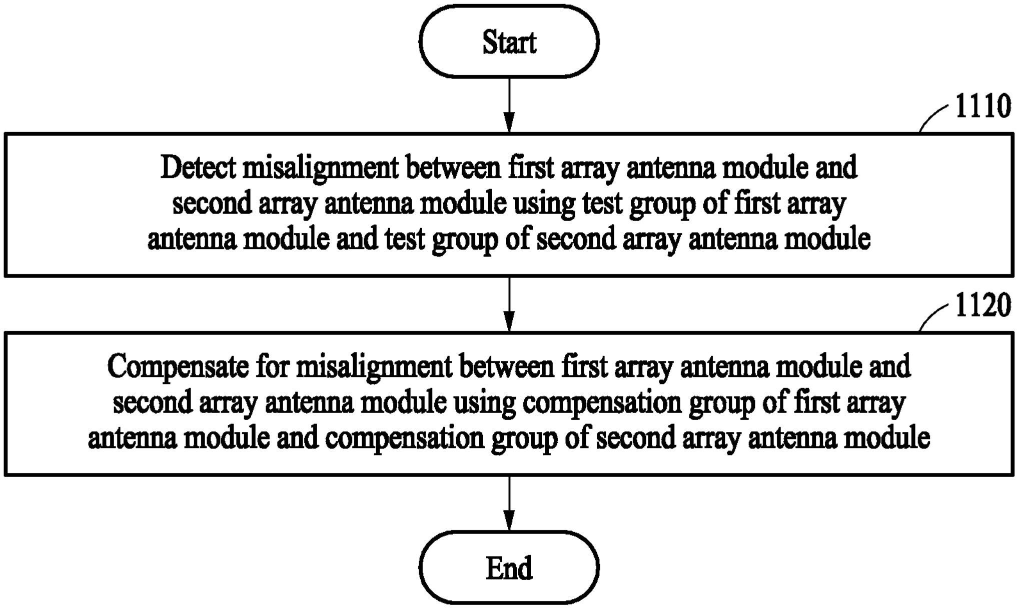
FIG. 11 is a flowchart illustrating a misalignment compensation method according to various embodiments.

FIG. 11 is a flowchart illustrating a misalignment compensation method according to various embodiments. Operations 1110 and 1120 to be described hereinafter with reference to FIG. 11 may be performed sequentially or non-sequentially. In an embodiment, for example, the order of operations 1110 and 1120 may be changed, and/or at least two of operations 1110 and 1120 may be performed in parallel. Operations 1110 and 1120 may be to performed by at least one component (e.g., the controller 120 of FIG. 1, the controller 1012 of FIG. 10, and the processor 1021 of FIG. 10) of a communication device (e.g., the communication device 100 of FIG. 1 and the communication device 1010 of FIG. 10) and/or the misalignment compensation apparatus 1020 of FIG. 10.

Referring to FIG. 11, in operation 1110, misalignment between a first array antenna module and a second array antenna module may be detected using a test group of a first array antenna module and a test group of a second array antenna module, and in operation 1120, the misalignment between the first array antenna module and the second array antenna module may be compensated for using a compensation group of the first array antenna module and a compensation group of the second array antenna module.

An antenna circuit may further include a third array antenna module including third antenna elements and disposed adjacent to the first array antenna module, and a misalignment compensation method may further include detecting misalignment between the first array antenna module and the third array antenna module based on communication between a first test group of first antenna elements and a third test group of third antenna elements and detecting a defective module from among the first array antenna module, the second array antenna module, and the third array antenna module.

Operation 1120 may include obtaining a first test signal through communication between a first compensation group of the first antenna elements and a second compensation group of second antenna elements, determining a first compensation value based on a difference between the first test signal and a first normal signal, and correcting a beam setting of at least one of the first array antenna module and the second array antenna module based on the first compensation value.

Operation 1120 may further include obtaining a second test signal through communication between a first compensation group of the first antenna elements and a third compensation group of the third antenna elements and determining a second compensation value based on a difference between the second test signal and a second normal signal, and the correcting of the beam setting may include correcting the beam setting of at least one selected from the first array antenna module, the second array antenna module, and the third array antenna module by combining the first compensation value and the second compensation value. The misalignment compensation method described above with reference to FIGS. 1 to 10 may also be applied to the misalignment compensation method of FIG. 11.

The electronic device according to embodiments may be one of various types of electronic devices. The electronic device may include, for example, a communication device (e.g., a smartphone and network equipment), a computer device, a portable multimedia device, a portable medical device, a camera, a wearable device, or a home appliance device. According to embodiments of the disclosure, the electronic device are not limited to those described above.

It should be understood that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an embodiment, the module may be implemented in a form of an application-specific integrated circuit (ASIC), for example.

Embodiments as set forth herein may be implemented as software including one or more instructions that are stored in a storage medium (e.g., the controller 1012 of FIG. 10, a memory (not shown), and the memory 1022 of FIG. 10) that is readable by a machine (e.g., the communication device 1010 of FIG. 10 and the misalignment compensation apparatus 1020 of FIG. 10). In an embodiment, for example, a processor (e.g., the controller 1012 of FIG. 10 and the memory 1022 of FIG. 10) of the machine (e.g., the communication device 1010 and the misalignment compensation apparatus 1020 of FIG. 10) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Herein, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A communication device comprising:

a first array antenna module comprising first antenna elements;

a second array antenna module comprising second antenna elements and disposed adjacent to the first array antenna module; and a controller which detects misalignment between the first array antenna module of the communication device and the second array antenna module of the communication device based on communication between a first test group of the first antenna elements and a second test group of the second antenna elements.

2. The communication device of claim 1, wherein the controller obtains a test signal through the communication between the first test group of the first antenna elements and the second test group of the second antenna elements, and detects the misalignment between the first array antenna module and the second array antenna module based on a difference between the test signal and a normal signal.

3. The communication device of claim 2, wherein the controller compares a gain and phase of the test signal to a gain and phase of the normal signal.

4. The communication device of claim 1, further comprising:

a third array antenna module comprising third antenna elements and disposed adjacent to the first array antenna module, wherein the controller detects misalignment between the first array antenna module and the third array antenna module based on communication between the first test group of the first antenna elements and a third test group of the third antenna elements, and detects a defective module from among the first array antenna module, the second array antenna module, and the third array antenna module.

5. The communication device of claim 1, wherein the first test group is positioned in an outer region of the first array antenna module facing the second array antenna module, and the second test group is positioned in an outer region of the second array antenna module facing the first array antenna module.

6. The communication device of claim 1, wherein the first antenna elements and the second antenna elements have a dual polarized structure with opposite polarities and communicate with each other.

7. The communication device of claim 1, wherein the controller performs a first test by applying a first polarity to the first antenna elements and applying a second polarity to the second antenna elements;

performs a second test by applying the second polarity to the first antenna elements and applying the first polarity to the second antenna elements; and detects the misalignment between the first array antenna module and the second array antenna module based on the first test and the second test.

8. The communication device of claim 1, wherein the controller obtains a first test signal through communication between a first compensation group of the first antenna elements and a second compensation group of the second antenna elements;

determines a first compensation value based on a difference between the first test signal and a first normal signal; and corrects a beam setting of at least one selected from the first array antenna module and the second array antenna module based on the first compensation value.

9. The communication device of claim 8, further comprising:

a third array antenna module comprising third antenna elements and disposed adjacent to the first array antenna module, wherein the controller obtains a second test signal through communication between the first compensation group of the first antenna elements and a third compensation group of the third antenna elements;

determines a second compensation value based on a difference between the second test signal and a second normal signal; and corrects a beam setting of at least one selected from the first array antenna module, the second array antenna module, and the third array antenna module by combining the first compensation value and the second compensation value.

10. The communication device of claim 9, wherein the controller combines the first compensation value and the second compensation value by performing interpolation based on the first compensation value and the second compensation value.

11. The communication device of claim 8, wherein the controller applies a corrected beam setting to a beambook parameter.

12. A misalignment compensation apparatus comprising:

a processor; and a memory configured to store instructions executable by the processor, wherein the processor, when the instructions are executed by the processor, detects misalignment between a first array antenna module of a communication device and a second array antenna module of the communication device using a first test group of the first array antenna module and a second test group of the second array antenna module; and compensates for the misalignment between the first array antenna module and the second array antenna module using a first compensation group of the first array antenna module and a second compensation group of the second array antenna module.

13. The misalignment compensation apparatus of claim 12, wherein the communication device further comprises:

a third array antenna module disposed adjacent to the first array antenna module, and the processor detects misalignment between the first array antenna module and the third array antenna module based on communication between the first test group of the first array antenna module and a third test group of the third array antenna module; and detects a defective module from among the first array antenna module, the second array antenna module, and the third array antenna module.

14. The misalignment compensation apparatus of claim 12, wherein the processor obtains a first test signal through communication between the first compensation group of the first array antenna module and the second compensation group of the second array antenna module;

determines a first compensation value based on a difference between the first test signal and a first normal signal; and corrects a beam setting of at least one selected from the first array antenna module and the second array antenna module based on the first compensation value.

15. The misalignment compensation apparatus of claim 14, wherein the communication device further comprises:

a third array antenna module disposed adjacent to the first array antenna module, and the processor obtains a second test signal through communication between the first compensation group of the first array antenna module and a third compensation group of the third array antenna module;

determines a second compensation value based on a difference between the second test signal and a second normal signal; and corrects a beam setting of at least one selected from the first array antenna module, the second array antenna module, and the third array antenna module by combining the first compensation value and the second compensation value.

16. A misalignment compensation method comprising:

detecting misalignment between a first array antenna module of a communication device and a second array antenna module of the communication device using a first test group of the first array antenna module and a second test group of the second array antenna module, wherein the first array antenna module and the second array antenna module are disposed adjacent to each other; and compensating for the misalignment between the first array antenna module and the second array antenna module using a first compensation group of the first array antenna module and a second compensation group of the second array antenna module.

17. The misalignment compensation method of claim 16, wherein the communication device further comprises:

a third array antenna module disposed adjacent to the first array antenna module, and the misalignment compensation method further comprises:

detecting misalignment between the first array antenna module and the third array antenna module based on communication between the first test group of the first array antenna module and a third test group of the third array antenna module; and detecting a defective module from among the first array antenna module, the second array antenna module, and the third array antenna module.

18. The misalignment compensation method of claim 16, wherein the compensating for the misalignment comprises:

obtaining a first test signal through communication between the first compensation group of the first array antenna module and the second compensation group of the second array antenna module;

determining a first compensation value based on a difference between the first test signal and a first normal signal; and correcting a beam setting of at least one selected from the first array antenna module and the second array antenna module based on the first compensation value.

19. The misalignment compensation method of claim 18, wherein the communication device further comprises:

a third array antenna module disposed adjacent to the first array antenna module, the compensating for the misalignment further comprises:

obtaining a second test signal through communication between the first compensation group of the first array antenna module and a third compensation group of the third array antenna module; and determining a second compensation value based on a difference between the second test signal and a second normal signal, and the correcting the beam setting comprises correcting a beam setting of at least one selected from the first array antenna module, the second array antenna module, and the third array antenna module by combining the first compensation value and the second compensation value.

20. A non-transitory computer-readable storage medium storing instructions that, when executed by a processor, cause the processor to perform the misalignment compensation method of claim 16.

* * * * *